United States Patent [19]

Fong et al.

[11] Patent Number: 5,069,683
[45] Date of Patent: Dec. 3, 1991

[54] PROCESS OF MAKING A RECHARGEABLE BATTERY

[75] Inventors: Rosamaria Fong, Richmond; Harith Al-Janby, North Delta; Jeffrey R. Dahn, Surrey, all of Canada

[73] Assignee: Moli Energy Limited, Canada

[21] Appl. No.: 654,814

[22] Filed: Feb. 13, 1991

Related U.S. Application Data

[62] Division of Ser. No. 350,396, May 11, 1989, Pat. No. 5,028,500.

[51] Int. Cl.[5] ............................................. H01M 10/38
[52] U.S. Cl. .................................. 29/623.1; 29/623.5; 429/218
[58] Field of Search ........................... 29/623.1, 623.5; 429/194, 218; 423/445

[56] References Cited

U.S. PATENT DOCUMENTS 4,615,959 10/1986 Hayashi et al. ...................... 429/194
4,945,014 7/1990 Miyabayashi et al. ............... 429/219
4,959,281 9/1990 Nishi et al. ........................... 429/194

Primary Examiner—Anthony Skapars
Attorney, Agent, or Firm—Lerner, David, Littenberg, Krumholz & Mentlik

[57] ABSTRACT

A rechargeable battery of alkali metal, organic electrolyte tape has a low surface area particulate carbonaceous electrode intercalable with the alkali metal and experiences little capacity loss upon intercalation of the carbonaceous electrode with the alkali metal. The carbonaceous electrode may include a multi-phase composition including both highly graphitized and less graphitized phases or may include a single phase, highly graphitized composition which has been subjected to interlation of lithium at above about 50° C. Incorporation of an electrically conductive filamentary material such as carbon black intimately interspersed with the carbonaceous composition minimizing capacity loss upon repeated cycling.

8 Claims, 1 Drawing Sheet

PROCESS OF MAKING A RECHARGEABLE BATTERY

This is a division of application Ser. No. 07/350,396, filed May 11, 1989, now U.S. Pat. No. 5,028,500.

BACKGROUND OF THE INVENTION

The present invention relates to non-aqueous lithium cells, such as storage batteries.

Non-aqueous lithium cell storage batteries typically include an anode of metallic lithium, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, however, the flow of ions is reversed so that lithium ions pass from the electrochemically active material through the electrolyte and are plated back onto the lithium anode.

During each discharge/charge cycle small amounts of lithium and electrolyte are consumed by chemical reactions at newly created surfaces. As lithium inherently tends to form high surface area peaks or dendrites as it is plated back onto the anode, this reactive condition is aggravated. Furthermore, the dendritic peaks continue to grow until they eventually contact the cathode which causes the cell to fail. Additional amounts of lithium do not cohesively plate onto the anode during the charge cycle and result in the formation of spongy deposits near the anode surface. As these deposits are not in electrically conductive contact with the anode, they eventually detract from the capacity of the cell.

One approach to minimizing the consumption of lithium is to prevent the growth of lithium dendrites and spongy deposits so that only a low surface area layer is deposited. One method of accomplishing this is to provide a sheet-like porous separator on the lithium surface and apply substantial pressure on the separator, and hence on the anode. Typically, this pressure is applied as an inter-electrode pressure, also referred to as "stack pressure". This approach minimizes the dendritic and spongy growths of the lithium, and helps to insure that a low surface area plating is deposited. However, only cells with cylindrical symmetry can be made to withstand this large pressure with a thin metal casing. Rectangular and coin-shaped cells would require very thick casings in order to withstand this pressure without excessive flexing, thereby resulting in a larger battery and increased cost.

Only very expensive separators are available which are porous yet prevent dendritic penetration by lithium, and which are able to withstand the very large cell pressures which are developed. Even with these separators, however, there is a risk that the separator will be punctured by dendritic growth, so that only long recharge times may be used. Also, low discharge rates increase the chances of dendritic separator puncture during charging, thereby limiting the number of charge/discharge cycles which may be obtained.

Even when porous separators and stack pressure are used, a small percentage of lithium is still consumed during each discharge/charge cycle. Thus, in order to attain a practical cell life, it is necessary to include a substantial excess of lithium in the cells, thereby significantly increasing their cost and size.

Moreover, lithium metal is extremely reactive and has a low melting point. With lithium cells of large size there is a danger that the heat generated during abnormal cell operation may lead to melting of the lithium anode. Such melting would not only render the cell inoperative, but could also lead to direct contact between the molten lithium and the cathode material, resulting in a vigorous reaction that could rupture the cell casing.

In addition, the use of lithium metal as the anode material usually requires that a toxic salt, $LiAsF_6$, be used in the electrolyte in order to obtain optimum cell performance. The $LiAsF_6$ apparently contributes to formation of coatings on the lithium which enhances the performances of the cell. The use of this toxic substance, however, presents danger both during manufacture and in those situations where the cell casing may rupture.

Thus, there exists a need for a rechargeable cell which will provide the advantages provided by cells having lithium metal anodes, but which will not have the drawbacks associated with these types of cells. One approach has been to replace the lithium metal anode with a carbon anode such as coke or graphite intercalated with lithium metal to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell melting of the anode cannot occur even under abuse conditions. Also, because lithium is reincorporated in the anode by intercalation rather than by plating, dendritic and spongy lithium growth cannot occur.

This technique, however, has encountered numerous problems. As $Li_xC$ is a reactive material which is difficult to handle in air, it is preferably produced in-situ in a cell. In doing so, however, lithium and cell electrolyte are consumed in an irreversible process. This irreversible process results in an initial capacity loss for the cell which reduces the cell's overall performance. Another problem with this approach is that the cell exhibits a progressive loss of capacity over numerous charge/discharge cycles. This progressive loss is commonly referred to as "capacity fade".

Accordingly, there are still needs for further improvements in cells having carbon electrodes.

SUMMARY OF THE INVENTION

The present invention addresses these needs.

One aspect of the present invention provides a rechargeable battery comprising an alkali metal such as lithium, a first electrode intercalable with an alkali metal, a counterelectrode capable of reversibly incorporating the alkali metal and an electrolyte including an organic solvent and a salt of the alkali metal. The alkali metal in the cell typically is incorporated in the first electrode, the counterelectrode or both. The first electrode preferably includes a composition including carbon, desirably in particulate form, the composition having a surface area subsequent to intercalation with the alkali metal which is substantially similar to the surface area of the composition prior to intercalation with the alkali metal. Desirably, at least a portion of the composition is carbon having a degree of graphitization greater than about 0.40.

The term "degree of graphitization" refers to a parameter of the microstructure further defined below, having a numerical value between 0 and 1.0. In general, carbon having a high degree of graphitization has a more ordered microstructure more closely resembling the microstructure of graphite, whereas carbon having a low degree of graphitization has a less ordered microstructure more closely resembling that of coke. Carbon having a high degree of graphitization provides significant advantages with respect to charge capacity or maximum value of x in $Li_xC_6$, and also with respect to voltage stability during operation. However, attempts to use a carbon having a degree of graphitization above about 0.40 as an active material in an electrode of an alkali metal cell typically result in substantial irreversible reactions which cause substantial initial capacity losses. Although the present invention is not limited by any theory of operation, it is believed that the high-graphitization carbon can undergo a substantial increase in surface area during initial intercalation of the alkali metal, and that the high initial capacity loss associated with highly graphitized carbon is caused at least in part by this increase in surface area. Regardless of the mechanism of operation, intercalable carbon electrodes having a surface area subsequent to intercalation with the alkali metal which is substantially similar to the surface area prior to intercalation have been associated with little initial capacity loss in these rechargeable batteries.

Preferably, the alkali metal comprises lithium. The particulate composition of the first electrode may comprise a first phase and a second phase intimately admixed with the first phase. Desirably, substantially every particle of the composition includes both the first and second phases. The first phase desirably has a relatively high degree of graphitization, preferably above about 0.40, more preferably above about 0.80 and most preferably about 1.0. The second phase of the composition may comprise a carbonaceous material having a relatively low degree of graphitization, desirably less than about 0.40. Electrodes incorporating the preferred two-phase compositions are substantially resistant to increase in surface area during alkali metal intercalation and provide low initial capacity loss.

Alternatively, the composition may consist essentially of carbon having a degree of graphitization greater than about 0.40 which has been lithiated at a temperature greater than about 50° C. Initial lithiation of highly graphitized carbon electrodes at these elevated temperatures minimizes the initial capacity loss. Preferably, the lithiation temperature is between about 55° C. and about 70° C.

A further aspect of the present invention provides a rechargeable battery having a first electrode and a counterelectrode each capable of reversibly incorporating an alkali metal such as lithium and an electrolyte comprising an organic solvent and a salt of the alkali metal wherein the first electrode comprises a particulate composition including carbon, and an electrically conductive filamentary material interspersed with the carbon-containing composition. The addition of electrically conductive filamentary materials to a particulate intercalable carbon electrode substantially suppresses capacity fade upon repeated charge/discharge cycling of the battery. It has also been found that incorporation of electrically conductive filamentary materials into intercalable carbon electrodes substantially reduces the need to maintain pressure on the electrode assemblies. Thus, where the preferred conductive filamentary materials are present in the carbonaceous electrode, the cell can operate satisfactorily without physical pressure on the anode and without appreciable capacity fade. This represents a major advance in that any attempt to operate without pressure on the anode would normally lead to rapid and severe capacity fade. Carbonaceous compositions such as graphite and coke have high electrical conductivity in their own right. Indeed, these materials have been used heretofore as conductivity enhancers in electrodes formed from other particulate materials. It is accordingly surprising that addition of another conductive material to carbonaceous electrodes would offer any performance benefit. Desirably, the filamentary material includes carbon black, preferably having a surface area of less than about 50 $m^2/g$. In preferred batteries in accordance with this embodiment of the present invention, the first electrode includes between about 1 wt.% and about 12 wt.% of the filamentary material, between about 4 wt.% and about 7 wt.% of the filamentary material being more preferred.

Yet another aspect of the present invention provides a rechargeable battery having a first electrode intercalable with an alkali metal such as lithium, a counterelectrode intercalable with the alkali metal and an electrolyte comprising an organic solvent and a salt of the alkali metal wherein the first electrode comprises a particulate composition including carbon having a surface area of less than about 10 $m^2/g$ and most preferably less than about 8 $m^2/g$. Desirably, the carbon has a surface area of less than about 6 $m^2/g$, a surface area of less than about 4 $m^2/g$ being more preferable, and less than about 2 $m^2/g$ being most preferred. This aspect of the present invention incorporates the discovery that the surface area of alkali metal intercalable carbonaceous material included in the electrode has a substantial effect on the initial capacity loss incurred by the cell. This is so even with carbonaceous materials which do not incur an increase in surface area upon intercalation of the alkali metal, such as carbonaceous materials with low graphitization.

Another aspect of the present invention provides a process of making a rechargeable battery comprising the steps of intercalating an alkali metal such as lithium into a carbon-containing composition including carbon having a degree of graphitization in above about 0.40, at least a portion of said intercalating step being performed at a temperature above about 50° C., forming said composition into a first electrode and assembling said first electrode with an electrochemically-active counterelectrode and an electrolyte including a salt of said alkali metal in a cell housing. Preferably, the intercalation step is conducted after the electrode-forming and assembling steps, and the alkali metal is intercalated into said composition while said composition is in said electrode in said cell housing.

These and other objects will become apparent, as will a better understanding of the structure and operation of the present invention, when reference is made to the description which follows taken with the drawings in which:

DETAILED DESCRIPTION OF THE PREFERRED EMBODIMENTS

Figure 1:
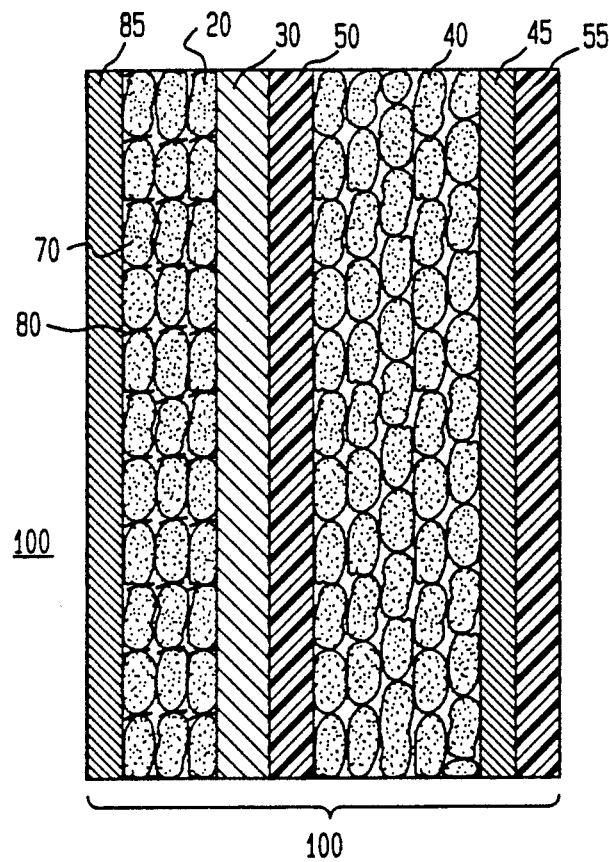
FIG. 1 is a diagrammatic drawing of a portion of a rechargeable battery in accordance with the present invention during an intermediate stage in the manufacturing process.

A process according to one embodiment of the present invention includes the step of providing a first electrode or anode formed from a particulate composition including carbon together with a filamentary, electrically conductive material such as carbon black. As used in this disclosure, the term "carbon" should be understood as referring to forms of carbon other than diamond. Different forms of carbon which are at least partially crystalline can be characterized by their respective degrees of graphitization. As used in this disclosure, the term "degree of graphitization" refers to the value g according to the formula:

$$g = \frac{3.45 - d(002)}{0.085}$$

where d (002) is the spacing between the graphitic layers of the carbon in the crystal structure measured in Angstrom units. The spacing d between graphite layers is measured by standard X-ray diffraction techniques. The positions of diffraction peaks corresponding to the (002), (004) and (006) Miller indices are measured, and standard least-squares techniques are employed to derive spacing which minimizes the total error for all of these peaks. This technique may be employed even where the sample includes intimately admixed plural phases having differing degrees of graphitization. The term "mean degree of graphitization" as used herein with reference to a two-phase material, refers to a value for degree of graphitization calculated from the spacing d(002) determined by subjecting the two-phase material to the same X-ray diffraction technique without attempting to separate the phases from one another.

In the process according to this embodiment, the particulate carbonaceous composition has a first phase of carbon with a relatively high degree of graphitization, typically about 1.00, and a second phase with a relatively low degree of graphitization, typically less than about 0.40. The mean degree of graphitization desirably is above about 0.40. Both the first and second phases are included in substantially every particle. One such two-phase carbonaceous material is generally known as isotropic graphite. Isotropic graphite can be made by mixing finely milled graphite, having a degree of graphitization of about 1.0 and a particle size of about 1 micron, with a petroleum pitch binder, and then heating the mixture so as to convert the pitch to coke or a partially graphitized form of carbon. One suitable form of isotropic graphite is available under the designations EC-110 from Graphite Sales, Inc. of Chagrin Falls, Ohio, U.S.A. Another form of carbonaceous material which can be used is known as spherical graphite. Spherical graphite may be made by injecting droplets of fluidized coke into a furnace at a temperature above the graphitization temperature of carbon. The resulting material has substantially a graphitic phase which may include small graphitic domains or grains at different orientations, and a less graphitized phase which may be present as an interstitial phase, at the grain boundaries. One suitable spherical graphite is available from Superior Graphite Co. of Chicago, Ill., U.S.A. under the designation 9400 series spherical graphite.

Desirably, the surface area of the particulate composition, when assembled into the cell, is less than about 15 m²/g, and more desirably less than about 10 m$^2$/g as determined by the Brunauer-Emmett-Teller or "BET" method. Carbons having surface areas of less than about 8 m$^2$/g are preferred, less than about 6 m$^2$/g more preferred, and less than about 4 m$^2$/g most preferred. Desirably, however, the particulate carbonaceous composition has a surface area of at least about 0.03 m$^2$/g.

Desirably, the anode contains between about 1 wt.% and about 12 wt.% of the filamentary, electrically conductive material; additions of between about 4 wt.% and about 7 wt.% of said filamentary material are more desirable. Desirably, the filamentary material is provided in the form of carbon black. Preferred carbon blacks are filamentary in that they consist of numerous particles connected together. When viewed under magnification, each set of connected particles is similar in appearance to a string of pearls. More preferred are filamentary carbon blacks which are less that about 50 m$^2$/gm; filamentary carbon blacks having surface areas of about 40 m$^2$/gm are most preferable. Carbon blacks having these characteristics include acetylene black and battery black.

The particulate carbonaceous composition and the filamentary, conductive material are admixed with one another and formed into an anode of the desired shape, so that within the anode the filamentary material 80 is interspersed with the particles 70 of the carbonaceous composition, as schematically indicated in FIG. 1. A sheet-like anode 20 may be fabricated on a substantially inert but electrically conductive anode current collector 85 by a process as disclosed in co-pending, commonly assigned U.S. patent application Ser. No. 07/204,072 filed June 8, 1988. The disclosure of said '072 application is hereby incorporated by reference herein. This method includes the steps of dispersing an electrochemically active material and a binder in a solvent to form a slurry. The slurry is then deposited in a layer on a sheet-like current collector substrate. The substrate for a carbonaceous electrode may consist of a metallic foil or expanded metal such as stainless steel, nickel or copper. Once the solvent in the layer has substantially evaporated, the layer may be densified by compacting on the substrate to provide an electrode. In fabrication of the anode according to this method, the particulate carbonaceous composition and the filamentary material may be incorporated in a common slurry, and the slurry may be agitated to mix these components intimately before the slurry is deposited and dried.

In order to form a rechargeable cell, the anode is combined with other elements to form a layered or "sandwich" structure 100 as generally shown in FIG. 1. Thus anode 20, formed from a carbon-containing composition by a method such as described above, is assembled with an electrochemically active cathode or counterelectrode 40 capable of reversibly incorporating lithium. Counterelectrode 40 may incorporate a particulate material which is lithiumintercalable or otherwise capable of reversibly reacting with lithium. The particulate material is disposed on a sheet-like electrically conductive cathode current collector 45. The particulate, lithium intercalable cathode material may be a transition metal chalcogenide. Preferred compositions include molybdenum sulfides, vanadium oxides and manganese oxides. $MoS_2$, $V_6O_{13}$, $Mo_6S_8$ and $MnO_2$ are more preferred, with $MnO_2$ being most preferred. The particular forms of manganese dioxide disclosed in co-pending, commonly assigned U.S. patent application Ser. No.

07/217,668 filed July 11, 1988 are especially preferred. The disclosure of said '668 application is hereby incorporated by reference herein. The particulate cathode material may be distributed on the sheet-like current collector 45 by a slurrying and coating process similar to that discussed above in connection with the anode. A sheet-like porous, electrically insulating separator 50, which may be a microporous polypropylene or a polymeric mesh, is interposed between cathode 20 and anode 40.

A sheet of lithium metal 30 is placed between cathode 20 and separator 50 so that the lithium sheet lies adjacent to, and in contact with, the anode 20. Preferably, the size of the lithium metal sheet 30 is chosen so that the surface of the sheet is co-extensive with the surface of the anode 20, and the thickness of the sheet 30 is chosen so that the correct amount of lithium is present for the intercalation reaction as discussed below.

Sandwich structure 100 may further include an additional separator 55 disposed on cathode current collector 45. This sandwich structure may be wound around a metallic center post 110, thus forming the sandwich structure into a convoluted, spiral configuration. In this spiral configuration, the additional separator 55 lies between the anode current collector 85 of the sandwich structure on one turn of the spiral and the cathode current collector 45 on the next adjacent turn, thus maintaining the anode 20 and cathode 40 electrically insulated from one another. The sandwich structure may be wound onto the center post 110 under some tension, where tension facilitates the winding process. This tension may produce a compressive load between neighboring turns of the spiral structure. Compressive load between components in a cell is also referred to as "stack pressure". However, there is no need to apply any particular degree of stack pressure, and the winding tension may be entirely omitted.

The spiral assembly is then fitted into a cell casing 10 and the cell casing 10 is closed by cell cap 120. The anode and cathode current collector are electrically connected by conventional means (not shown) with cell casing 10 and cap 120, respectively. Casing 10 and cap 120 are insulated from each other and serve as terminals for the finished cell.

An electrolyte, preferably including a lithium salt or other lithium-containing compound dispersed in a suitable organic solvent and compatible with both the cathode and anode materials, is added to the cell, typically through an opening 130 in the cap which is subsequently sealed. Desirably, the electrolyte solvent is capable of wetting the separators and particulate materials. The electrolyte solvent preferably includes ester solvents, such as propylene carbonate (PC), ethylene carbonate (EC), or mixtures thereof. When the solvent comprises both PC and EC, the ratio of PC to EC, by volume is preferably about 1:3 to about 3:1, more preferably about 1:2 to 2:1, and even more preferably, about 1:1. Other solvents may be used such as 2-methyl tetrahydrofuran (2-MTHF), tetrahydrofuran, sulfolane, dimethylsulfite, monoglyme (1,2-dimethoxyethane), diglyme, triglyme, tetraglyme, p-dioxane, 1,3-dioxane, dimethoxymethane, diethylether and trimethoxyethane. Of the lower viscosity solvents, 2-MTHF is preferred. One useful electrolyte solvent includes about 75% 2-MTHF, 12.5% PC and 12.5% EC, all by volume. References in this disclosure to percentages of solvent ingredients by volume should be understood as referring to the volume of the individual ingredients prior to mixing. Suitable electrolyte salts include $LiAsF_6$; $LiPF_6$; $LiClO_4$; $LiBF_4$; $LiB(C_6H_5)_4$; $LiCF_3F$; $LiAlCl_4$; LiBr; and mixtures thereof. The less toxic salts are more preferred.

The addition of the electrolyte to the cell causes the lithium metal in sheet 30 to intercalate into the carbonaceous composition of anode 20, as the lithium metal has a higher electrochemical potential than the anode. In effect, the lithium sheet 30 and anode 20 constitute a temporary cell having a lithium electrode and a carbonaceous electrode. Because sheet 30 is electrically connected to anode 20 by the physical contact between these elements, this temporary cell is short-circuited. Accordingly, the temporary cell discharges, with lithium passing from the high-potential electrode (sheet 30) to the lower potential electrode (anode 20). In this embodiment of the invention, this initial lithiation process desirably is conducted at about room temperature (20° C.) or below. This initial lithiation process continues until the lithium metal in sheet 30 is totally consumed by the carbon of anode 20 in the formation of $Li_xC_6$, or until the anode 20 has become saturated with lithium, whichever occurs first. Desirably, the amount of lithium in sheet 30 is equal to the amount of lithium required to saturate anode 20, so that the lithium sheet is entirely consumed and anode 20 is fully saturated with lithium. Typical isotropic graphite compositions will take up between 0.5 and 1 mole of lithium for each 6 moles of carbon in the composition, i.e., isotropic graphite typically will intercalate Li up to a value of x between 0.5 and 1.0 in the formula $Li_xC_6$. The carbon black incorporated in anode 20 also will take up some lithium, typically up to about x=0.5 in the formula $Li_xC_6$, i.e., 1 mole of Li for each 12 moles of carbon black.

The preferred particulate carbon-containing compositions used to form the anode in this embodiment does not exfoliate to any appreciable degree during the first intercalation of lithium into the composition. As used in this application the term "exfoliate" refers to a change in the material resulting in an increase in its surface area subsequent to intercalation with lithium metal as compared to its surface area prior to intercalation. Thus, the surface area of the particulate carbonaceous composition subsequent to intercalation with lithium metal is substantially equal to the surface area which existed prior to intercalation with lithium metal. The tendency of a carbon-containing material to exfoliate is largely dependent upon the degree of graphitization of the carbon material. Carbon which is highly graphitic has an organized layered structure wherein the layers are easily separated or exfoliated.

The substantial absence of exfoliation observed with the preferred carbonaceous compositions is thus surprising because these compositions incorporate a highly graphitized phase, which phase would be expected to undergo substantial exfoliation. Although the present invention is not limited by any theory of operation, it is believed that the substantially non-graphitic phase surrounding the highly graphitized phase in each particle of the preferred isotropic graphite materials acts to reinforce the highly graphitized phase in some way and thus to prevent exfoliation of the highly graphitized phase.

Cells according to this aspect of the present invention, incorporating the preferred particulate carbonaceous compositions such as isotropic or spherical graphite in a form where the particulate composition has a relatively low surface area as discussed above undergo relatively little electrolyte decomposition during the initial lithiation. It is believed that the electrolyte decomposition reaction is a reaction of lithium with the electrolyte solvent at the surface of the carbonaceous particles. It is further believed that this reaction results in formation of a passivating film on the surface of the carbon particle and that this passivating film prevents further reaction. In any event, in the absence of exfoliation, the amount of electrolyte decomposition is substantially proportional to the surface area of the carbon particles in the anode. Thus, it is believed that the relatively low degree of electrolyte decomposition observed with the preferred particulate carbonaceous compositions results both from the low surface area of the particulate composition before the initial intercalation process and from the substantial absence of new surface area created by exfoliation during the initial lithiation.

The carbon black employed as the conductive filamentary material has a relatively high surface area per unit mass. However, the amounts of carbon black utilized in preferred embodiments of the present invention are relatively small, and hence electrolyte solvent reactions and loss of capacity caused by reaction at the carbon black surface ordinarily are insignificant.

Once the lithium sheet 30 has been substantially consumed and the particulate, carbonaceous composition of the anode has been saturated by lithium, the cell is in a charged condition and ready for use. The cell is employed in the normal fashion. During discharge, anode 20 is electrically connected to cathode 40 via an external electrical load connected to cell casing 10 and cell cap 120 and hence connected across the anode current collector 85 and cathode current collector 45. During discharge, lithium passes from the particulate carbonaceous composition of anode 20 through the electrolyte and to the electrochemically active material of cathode 40, where the lithium is intercalated into the cathode material. During recharge, the process is reversed under the influence of an externally applied potential so that lithium is withdrawn from the cathode material and re-intercalated into the particulate carbonaceous composition of the anode 20.

Cells incorporating the preferred isotropic graphite T spherical graphite particulate compositions have relatively stable voltage during discharge. The total cell voltage at any given state of charge or discharge is the arithmetic difference between the potential of the cathode material relative to a fixed reference material such as metallic lithium and the voltage or electrochemical potential of the partially lithiated carbon composition relative to the same reference. The electrochemical potential of isotropic graphite relative to a lithium reference varies by less than about 0.2 volts over the major portion of the cell capacity from $x=0.2$ to the maximum attainable value of $x$ in $Li_xC_6$. Thus, during discharge from the fully charged state (maximum attainable value of x) to a substantially discharged state (x approximately equal to 0.2) the variation in the total cell voltage will be approximately equal to the variation inherent in the cathode material.

Moreover, cells according to this embodiment of the invention are resistant to capacity fade or progressive loss of capacity over repeated charge and discharge cycles. Typically, the capacity fade amounts to about 0.1% or less of the cell capacity for each charge/discharge cycle. Provided that the conductive filamentary material such as carbon black is incorporated in the anode, acceptable resistance to capacity fade is provided even where there is no pressure on the anode. This is particularly surprising inasmuch as cells incorporating particulate carbonaceous materials ordinarily undergo substantial capacity fade unless pressure on the anode is maintained during cycling, as by maintaining inter-electrode pressure or "stack pressure".

During the initial lithiation process, any stack pressure which may have been induced by the winding process is substantially relieved, as the lithium sheet disappears. However, because it is not necessary to maintain stack pressure in order to achieve acceptable cycling characteristics, this does not present a problem. Stated another way, the ability of cells according to preferred embodiments of the invention, incorporating the filamentary conductive material to operate without stack pressure greatly facilitates use of a consumable or sacrificial mass of lithium such as sheet 30 as a vehicle for introducing lithium into the cell during assembly. There is accordingly no need to lithiate either the anode material or the cathode material before assembly of the cell. Lithiated carbonaceous anode materials typically are unstable and difficult to handle. Moreover, many of the most useful cathode materials such as the manganese oxides are also unstable in air when fully lithiated. The ability to use a consumable mass or sheet is of particular advantage in production of cells incorporating cathode materials which, when lithiated, are not stable in air.

A cell according to a further embodiment of the invention is substantially the same as that described above, except that the cell incorporates a particulate, carbonaceous composition which consists essentially of highly graphitized carbon, i.e., carbon having a degree of graphitization above about 0.40 and desirably above about 0.80. Most preferably, cells according to this embodiment of the invention incorporate a particulate, carbonaceous composition having a degree of graphitization approximately equal to 1.00, i.e., a carbonaceous composition consisting essentially of graphite. Typically, each particle of such a composition includes only one phase. Desirably, the particulate, carbonaceous composition, as initially incorporated into the cell, has relatively low surface area, within the same ranges as discussed above in connection with the two-phase composition. Also, the anode in this embodiment desirably incorporates the same filamentary conductive material such as carbon black as discussed above, and in substantially the same proportions.

The manufacturing process used to make a cell in accordance with this embodiment may include the same sequence of steps as discussed above. However, in a process employing the mono-phase, highly graphitized particles, the initial litiation process should occur at a temperature above about 50° C., preferably above about 55° C. and most preferably between about 55° and 70° C. Desirably, the entire initial litiation step is conducted at temperatures within these preferred ranges. Thus, the cell, and preferably the electrolyte, are heated to a temperature within the preferred ranges before the electrolyte is introduced into the cell, and maintained at this elevated temperature during the initial lithiation process until some or all of the lithium in the consumable mass or sheet has been intercalated into the carbonaceous composition of the anode. When the graphitic carbonaceous composition is initially intercalated at such an elevated temperature, the electrolyte solvent decomposition reaction and the consequent consumption of lithium are substantially reduced in comparison with that which would occur during lithiation at room temperature (about 21° C.) or below. This result is particularly surprising inasmuch as elevated temperatures would be expected to accelerate the decomposition reaction. Moreover, subsequent delithiation and relithiation of the carbon composition do not result in substantial further decomposition reactions and capacity loss. Thus, the temperature prevailing during the first lithiation of the material has a profound effect on the capacity loss caused by the decomposition reaction where the particulate, carbonaceous composition is a substantially mono-phase, highly graphitized carbon. Likewise, exfoliation during the initial lithiation is substantially suppressed by conducting the lithiation within the preferred temperature ranges. Once the initial lithiation has been so conducted, there is no substantial further exfoliation during subsequent lithiations on repeated charge and discharge cycles.

Although the present invention is not limited by any theory of operation, it is believed that the elevated temperature results in a higher degree of decomposition reaction per unit surface area of the carbonaceous composition than would occur at room temperature. It is further believed, however, that the substantial absence of exfoliation maintains the initial, relatively low surface area of the carbonaceous composition and thus substantially limits the decomposition reaction and loss of capacity. Thus, the net effect of high-temperature lithiation is a reduction in the overall reaction. , It is further believed that the exfoliation observed during initial lithiation at relatively low temperatures with mono-phase, highly graphitic carbons is caused at least in part by intracrystalline stresses arising from introduction of lithium. The highly graphitized carbon when at an elevated temperature, may have an expanded crystal lattice and therefore suffer less stress or else may be able to withstand stresses more readily without exfoliation.

Cells according to this embodiment of the invention provide advantages generally similar to those discussed above. In particular, highly graphitic, monophase carbon compositions such as pure graphite can be charged and discharged over the range of $x=0$ to about $x=1$ in $Li_xC_6$ and hence provide particularly good capacity per unit mass. The carbonaceous material exhibits little change in electrochemical potential relative to a standard reference such as lithium over the range from about $x=0.2$ to $x=1$. Typically, the variation in electrochemical potential of the carbonaceous material throughout this range is less than about 0.2 volts. Moreover, where the conductive filamentary material is included, the cells cycle acceptably without stack pressure.

A cell according to a further embodiment of the invention may incorporate as the particulate, carbonaceous composition a substantially non-graphitic carbon, i.e., a carbon having a degree of graphitization less than about 0.40. Suitable substantially nongraphitic carbons include coke and particularly petroleum coke. In other respects, the cells may be substantially similar to those discussed above. Thus, the anode desirably incorporates the conductive filamentary material in admixture with the particulate, carbonaceous composition. To minimize the decomposition reaction and initial loss of capacity, the surface area of the particulate composition is desirably is relatively low, and preferably within the preferred ranges discussed above. The manufacturing process used to make cells according to this embodiment of the invention may be substantially as discussed above. However, because substantially non-graphitic carbon is substantially resistant to exfoliation during initial lithiation at substantially any practical lithiation temperature, the lithiation desirably is conducted at about room temperature or below. Although cells according to this embodiment, incorporating the substantially non-graphitic carbon provide good resistance to exfoliation and initial capacity loss, these cells are generally less preferred from the standpoint of specific capacity and voltage variation. Thus, substantially non-graphitic carbon ordinarily can take up lithium only to the extent of about $x=0.5$ in the formula $Li_xC_6$ and ordinarily exhibits substantial variation in its electrochemical potential relative to a fixed reference over its entire charge and discharge range.

Numerous variations and combinations of the features discussed above can be employed. For example, the sacrificial or consumable mass of lithium may be omitted where lithium is introduced into the cell in another way. Thus, lithium may be incorporated in the cathode material which is assembled into the cell. In this case, the cell, when assembled is in the discharged state. The carbonaceous composition is lithiated by applying an externally generated electrical potential to recharge the cell and draw lithium from the cathode material, through the electrolyte and into the carbonaceous material of the anode. This approach ordinarily is most practical where the cathode material, in its lithiated form is stable in air and hence can be handled readily. Examples of such air-stable lithiated cathode materials include lithiated nickel oxide, lithiated cobalt oxides and lithiated mixed oxides of cobalt with nickel or tin. Among the suitable oxides are $LiNiO_2$; $LiCoO_2$; $LiCo_{0.92}Sn_{0.08}O_2$; and $LiCo_{1-x}Ni_xO_2$. According to a variant of this approach, the particulate carbon composition can be lithiated before it is introduced to the cell. However, this approach suffers from the difficulties attendant upon handling of lithiated carbon outside of the cell. Lithiated carbon typically tends to react strongly with air. Regardless of the source of lithium or the location of the lithiation, however, the temperature during lithiation desirably should be conducted at about 20° C. or below except that when the carbonaceous composition includes a mono-phase, highly graphitized carbon lithiation should be conducted at an elevated temperature as noted above.

The cells can be made in a wide variety of physical configurations. For example, the spiral configuration illustrated and discussed above is entirely optional. Likewise, the current collectors employed in the illustrated cells may be omitted. Thus, cells without current collectors may incorporate substantially button-shaped electrodes made by a compaction process. A slurry prepared as above may be continuously mixed in an open reaction vessel while the solvent evaporates. The remaining dry material is broken up to form an essentially free flowing powder incorporating the filamentary material and particulate composition in intimate admixture. This powder may then be consolidated in an appropriate press in order to form electrodes of the desired shape. Powder consolidation processes of this type may be used to form button-shaped electrodes. Preferred button-shaped carbonaceous electrodes formed by this process have a density between about 0.5 gm/cc and about 2.0 gm/cc; more preferable are electrodes having a density between about 0.8 gm/cc and about 1.4 gm/cc.

The button-shaped electrodes may be disposed on opposite sides of a separator and connected to opposite sides of a generally button-shaped cell housing. Inasmuch as the preferred cells according to the present invention do not rely upon stack pressure, cells can be made without separators. For example, the anode and cathode may be disposed remote from one another within a cell container and mounted to respective, electrically isolated portions of the cell container so that the two electrodes do not touch one another.

having a degree of graphitization equal to about 1.00, a particle size of about 200 to about 400 mesh U.S. standard sieve size and a surface area of about 10 m²/gm with a 2% EPDM binder. All cells are operated under a stack pressure of 200 psi. The charge and discharge cycles are controlled so that each full charge and discharge occurs over a period of 100 hours. The first discharge of each cell, and hence the first transfer of lithium into the carbonaceous electrode occurs at a temperature as specified in Table II.

TABLE II

| CELL | TEMPERATURE AT FIRST CYCLE °C. | FIRST DISCHARGE CAPACITY Ah/g | SECOND DISCHARGE CAPACITY Ah/g | IRREVERSIBLE CAPACITY Ah/g |
|---|---|---|---|---|
| A | −10 | .390 | .013 | .377 |
| B | +21 | .658 | .290 | .368 |
| C | +55 | .450 | .322 | .128 |
| D | +70 | .431 | .330 | .101 |

The following non-limiting examples illustrate certain aspects of the invention.

EXAMPLE I

Several test cells are made, each incorporating a button-type carbonaceous anode, a lithium electrode and an electrolyte consisting of 1M LiAsF$_6$ in a solvent of equal volumes of propylene carbonate and ethylene carbonate. These test cells do not incorporate a cathode active material but rather are arranged for transfer of lithium only between the lithium metal electrode and the carbonaceous anode. The lithium electrode is spaced apart from the carbonaceous anode by a porous, non-conductive separator, so that electrical contact between the lithium and carbon electrodes can only be made through an external circuit. The external circuit is provided with appropriate devices for controlling current during discharge of the cell (during spontaneous transfer of lithium to the carbon electrode) and for applying electrical potential to recharge the cell (by transferring lithium from the carbonaceous electrode to the lithium electrode). The external circuit also includes devices for monitoring the voltage between the lithium and carbon electrodes. The anode of each cell incorporates petroleum coke as a particulate carbonaceous composition together with 2% EPDM polymer binder on a copper expanded metal current collector. Varying amounts of carbon black are added to the anodes of different cells as indicated in Table I. The cells are cycled repeatedly and tested for capacity fade with results as shown:

TABLE I

| CELL | PERCENT CARBON BLACK | STACK PRESSURE (Pounds Per Square Inch) | AVERAGE % DECREASE IN CAPACITY PER CYCLE |
|---|---|---|---|
| A | 0 | 200 | 0.1 |
| B | 0 | 0 | 90 |
| C | 2 | 0 | 10 |
| D | 3 | 0 | 4 |
| E | 5 | 0 | 0.6 |

These results demonstrate the effect of the conductive, filamentary carbon black in minimizing capacity fade.

EXAMPLE II

Test cells are made substantially in accordance with Example I, except that the anodes of all of the cells of this Example incorporate substantially pure graphite, The second charge/discharge cycle for all cells occurs at room temperature (approximately 21° C.). The capacity on the first discharge includes both reversible intercalation of lithium and the irreversible reaction related to decomposition of the electrolyte solvent. The capacity on the second cycle includes only the reversible capacity related to intercalation and deintercalation of lithium. The difference between the capacities on the first and second cycles yields the irreversible capacity, a measure of the magnitude of the irreversible decomposition reaction, as indicated in Table II.

EXAMPLE III

The procedure of Example II is repeated using two cells. One cell has a carbonaceous electrode incorporating as the particulate carbonaceous composition isotropic graphite of the type sold under the designation GSI-EC110 by a Graphite Sales Inc., of Chagrin Falls, Ohio, U.S.A. Another cell incorporates graphite of the type referred to as highly crystalline pure graphite and sold under the designation KS-15 by the Lonza Company of Fair Lawn, N.J., U.S.A. The initial lithiation is conducted at 21° C. During the initial lithiation, the voltage across the cell with the crystalline graphite electrode remains substantially stable for a considerable period at about 0.7 volts, indicating that substantial exfoliation is occurring. The current consumed during this period of voltage stability at about 0.7 volts corresponds to an irreversible capacity caused by exfoliation of about 0.19 Ah/g. The cell with the isotropic graphite does not exhibit any substantial period of voltage stability at about 0.7 volts, and has an irreversible capacity caused by exfoliation of less than 0.01 Ah/g.

EXAMPLE IV

A series of cells are made and tested substantially in accordance with Example III using monophase carbons having differing degrees of graphitization. The results are as indicated in Table III.

TABLE III

| CELL | DEGREE OF GRAPHITIZATION | IRREVERSIBLE CAPACITY DUE TO EXFOLIATION (Ah/g) |
|---|---|---|
| A | .155 | 0 |
| B | .207 | 0 |
| C | .236 | 0 |

TABLE III-continued

| CELL | DEGREE OF GRAPHITIZATION | IRREVERSIBLE CAPACITY DUE TO EXFOLIATION (Ah/g) |
|---|---|---|
| D | .322 | .016 |
| E | .437 | .130 |
| F | .597 | .180 |
| G | .604 | .190 |
| H | .903 | .185 |
| I | 1 | .185 |

These results indicate that a carbon having a degree of graphitization of about 0.4 or below is substantially resistant to exfoliation.

EXAMPLE V

Figure 2:
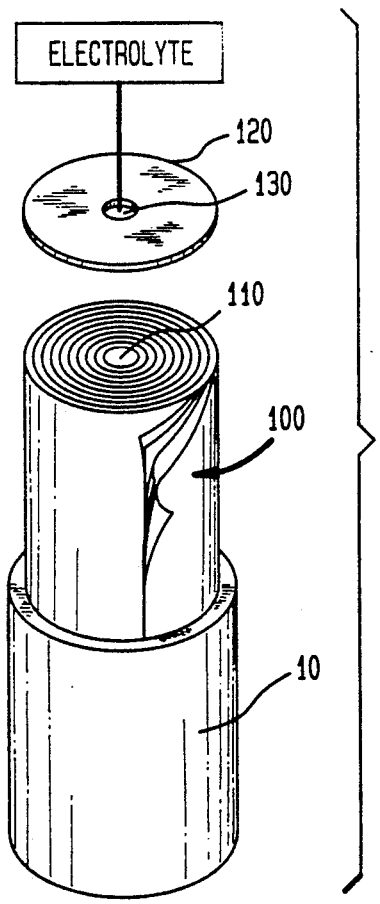
FIG. 2 is a further view of the cell of FIG. 1 during a further stage of the process.

An AA size test cell is fabricated generally in accordance with FIGS. 1 and 2 using petroleum coke as the particulate carbonaceous composition of the anode. The carbonaceous anode incorporates about 5% carbon black of the type sold under the designation Super S, and having a surface area of about 40 m²/g. The cathode material is a manganese dioxide treated in accordance with co-pending U.S. patent application Ser. No. 07/217,668. The separator is a microporous polypropylene fabric, and the electrolyte is 1M LiAsF$_6$ in mixed propylene carbonate and ethylene carbonate. Although the cell is spiral wound under tension with a lithium foil sheet, and hence has some stack pressure when initially assembled, this stack pressure substantially dissipates when the lithium is transferred from the sheet to the carbon electrode. A control cell is made the same way but without the carbon black in the anode. The cells are repeatedly cycled at 20° C. between a discharged voltage of 1.0 volts and a charged voltage of 3.3 volts using 20 mA charge and discharge currents. The test cell has an initial capacity of about 0.27 Ah. After the first cycles, the capacity of the test cell stabilizes at about 0.24 Ah and remains at about 0.23 Ah even after 40 cycles. The control cell, without carbon black, has an initial capacity of about 0.25 Ah, which decreases to about 0.02 Ah in only 3 cycles, at which point cycling of the control cell is halted.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as defined by the appended claims.

We claim:

1. A process of making an electrochemical cell comprising the steps of intercalating an alkali metal into a composition including carbon having a degree of graphitization above about 0.40, at least a portion of said intercalating step being performed at a temperature above about 50° C., forming said composition into a first electrode and assembling said first electrode with a counterelectrode capable of reversibly incorporating said alkali metal and an electrolyte including a salt of said alkali metal in a cell housing.

2. A process as claimed in claim 1 wherein said intercalating step is conducted after said electrode-forming and assembling steps, whereby said alkali metal is intercalated into said composition while said composition is in said first electrode in said cell housing.

3. A process as claimed in claim 2 wherein said alkali metal consists essentially of lithium.

4. A process as claimed in claim 3 wherein said composition includes carbonaceous particles each consisting essentially of carbon having a degree of graphitization above about 0.40.

5. A process as claimed in claim 3 wherein the entire step of intercalating said alkali metal into said composition is conducted at a temperature above about 50° C., or higher.

6. A process as claimed in claim 5 wherein the entire step of intercalating said alkali metal into said composition is conducted at a temperature between about 55° C. and about 70° C.

7. A method of making an electrochemical cell comprising the steps of assembling within a cell housing a mass of an alkali metal, a first electrode including a carbonaceous composition in particulate form and an electrically conductive filamentary material interspersed with said particulate composition, a counterelectrode capable of reversibly incorporating said alkali metal and an electrolyte incorporating a salt of said alkali metal in an organic solvent, said mass of alkali metal being electrically connected to said first electrode and electrically isolated from said counterelectrode whereby said alkali metal in said mass will be transferred from said mass and intercalated into said carbonaceous composition, said transfer being continued until said mass is substantially consumed.

8. A method as claimed in claim 3 wherein said assembling step includes the steps of placing said mass of said alkali metal in contact with said first electrode and placing a porous, electrically non-conductive separator between said electrodes.

* * * * *

UNITED STATES PATENT AND TRADEMARK OFFICE
CERTIFICATE OF CORRECTION

PATENT NO. : 5,069,683

DATED : December 3, 1991

INVENTOR(S) : Fong el al.

It is certified that error appears in the above-identified patent and that said Letters Patent is hereby corrected as shown below:

On the title page: under ABSTRACT Column, second line, "tape" should read --type--.

Column 9, line 45, "T" should read --or--.

Column 16, line 48, "3" should read --7--.

Signed and Sealed this

Twenty-seventh Day of April, 1993

*Attest:*

MICHAEL K. KIRK

*Attesting Officer*     *Acting Commissioner of Patents and Trademarks*